May 5, 1964     H. PRÖTT     3,131,814
COOLING ARRANGEMENT FOR EXTRUSION PRESSES
Filed June 13, 1958     5 Sheets-Sheet 1
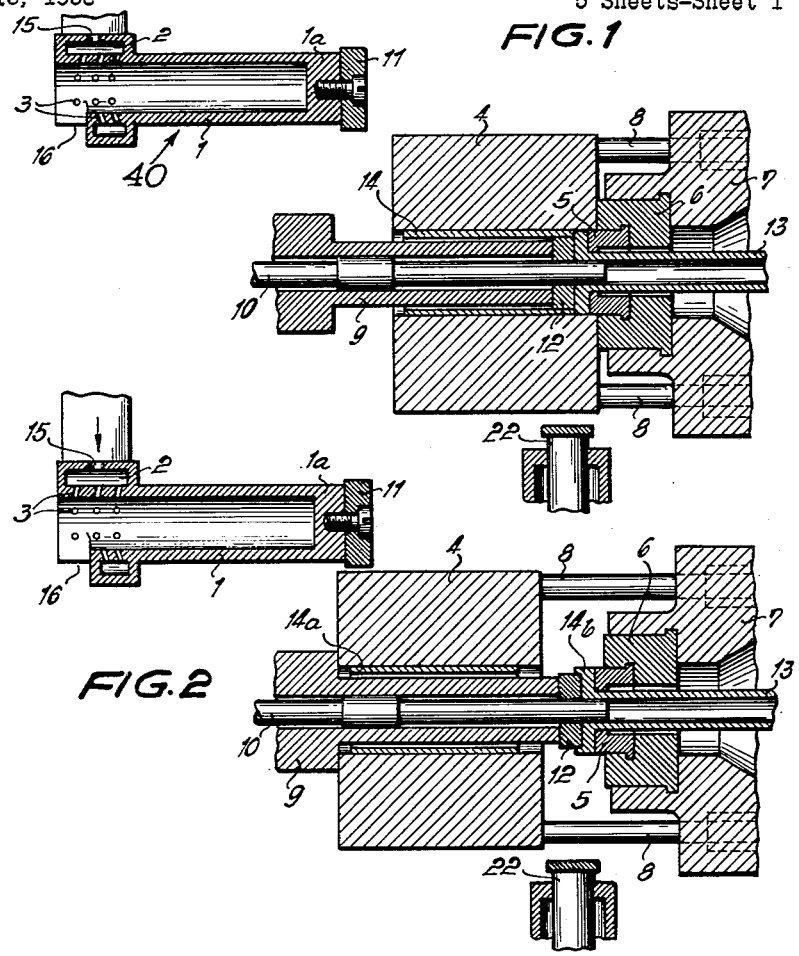
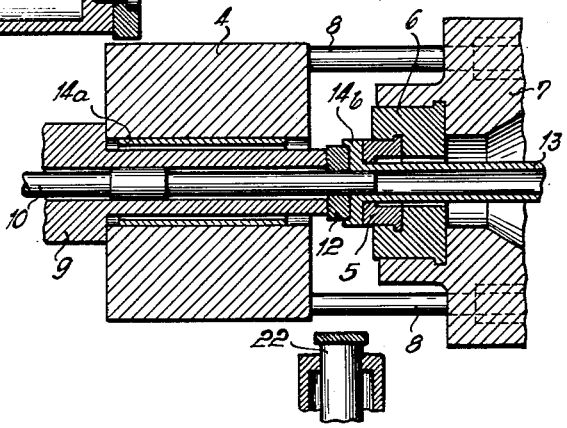
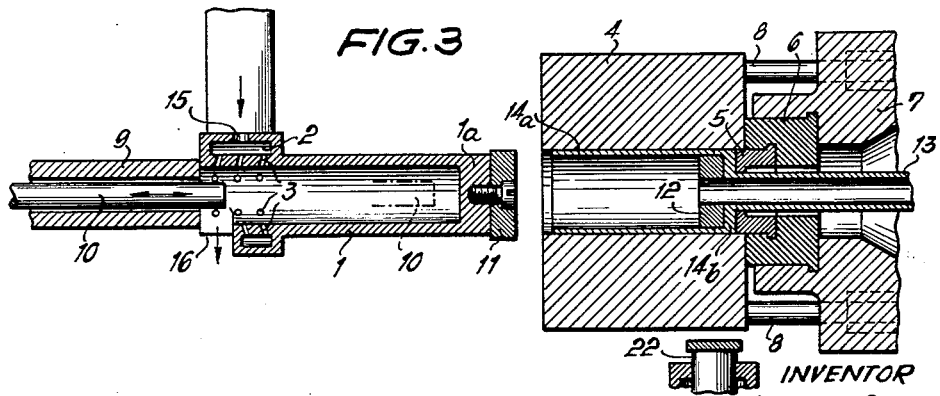
INVENTOR
Hermann Prött
by Michael S. Striker May 5, 1964    H. PRÖTT    3,131,814
COOLING ARRANGEMENT FOR EXTRUSION PRESSES
Filed June 13, 1958    5 Sheets-Sheet 2

INVENTOR
Hermann Prött
by: Michael S. Striker
Atty

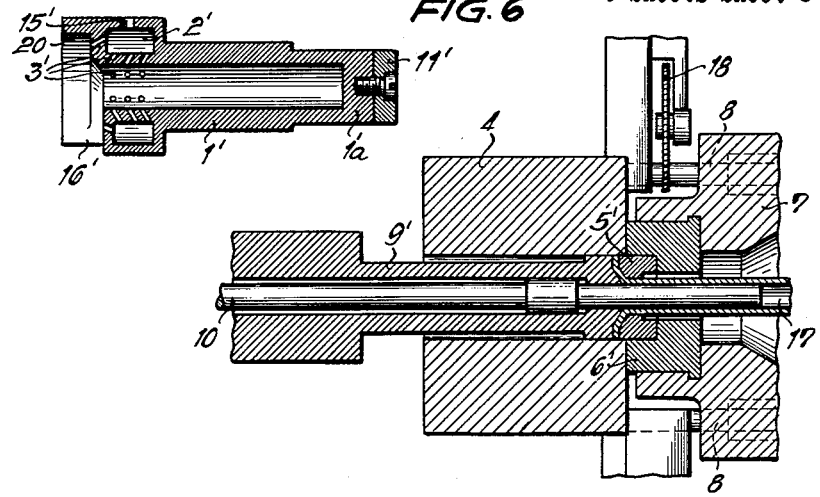
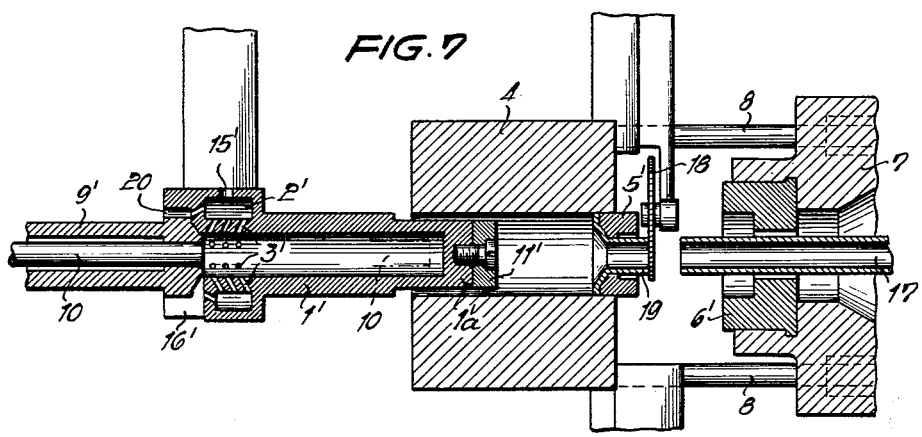
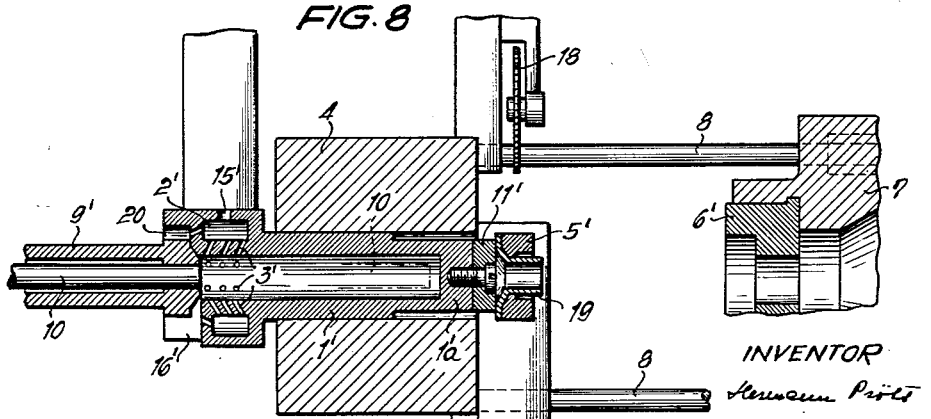

May 5, 1964  H. PRÖTT  3,131,814
COOLING ARRANGEMENT FOR EXTRUSION PRESSES
Filed June 13, 1958  5 Sheets-Sheet 4

INVENTOR
Hermann Prött
by: Michael S. Striker

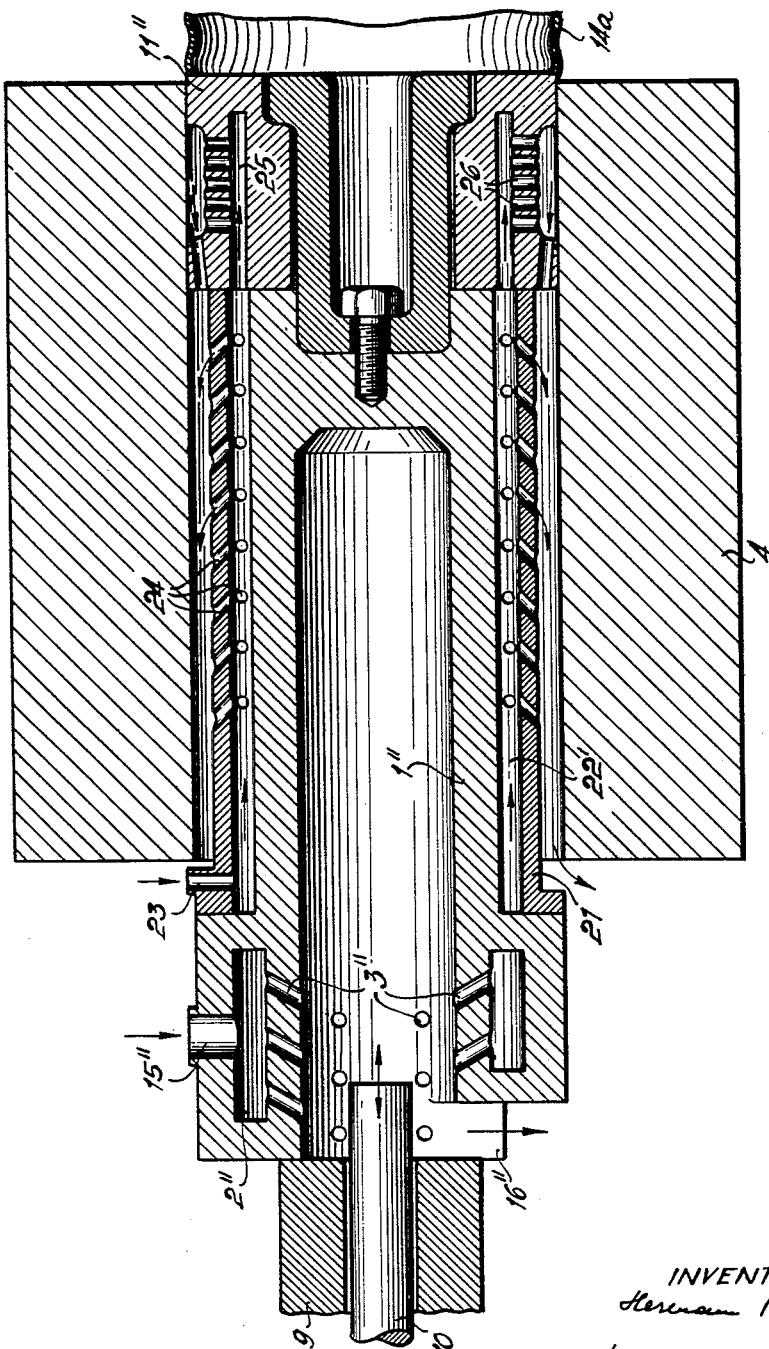

United States Patent Office 3,131,814
Patented May 5, 1964

3,131,814
COOLING ARRANGEMENT FOR EXTRUSION PRESSES
Hermann Prött, Duisburg, Germany, assignor to Hydraulik G.m.b.H., Duisburg, Germany
Filed June 13, 1958, Ser. No. 741,885
Claims priority, application Germany June 14, 1957
5 Claims. (Cl. 207—16)

The present invention relates to extrusion presses.

More particularly, the present invention relates to extrusion presses which are adapted to extrude metal tubes, and the present invention is applicable either to vertical or horizontal extrusion presses.

With extrusion presses of this type it is extremely important to cool such parts as the piercing ram, for example, so as to give such parts the longest possible life. However, at the present time this necessary cooling of the parts of the extrusion press is extremely time-consuming and greatly increases the operating time required for turning out parts such as tubes which are extruded by the extrusion press.

One of the objects of the present invention is to provide an extrusion press which is capable of cooling parts such as a piercing ram of the extrusion press without in any way increasing the operating time by this cooling.

Another object of the present invention is to provide an extrusion press which makes it possible to cool parts of the extrusion press while simultaneously performing other necessary operations, so that the cooling need not be performed separately from these other necessary operations and in this way the operating time is not undesirably increased by the necessity of cooling parts of the extrusion press.

A further object of the present invention is to provide an extrusion press which is capable of cooling several parts such as the piercing ram, the extrusion ram, and the container for the billet, while at the same time performing other necessary operations so that the operating time is not increased by the cooling of such parts of the extrusion press.

An additional object of the present invention is to provide a device which is capable of removing from the billet container of an extrusion press the portion of the billet which remains therein after a tube is extruded and which at the same time is capable of cooling parts of the extrusion press, so that the cooling takes place simultaneously with the necessary removal of the remaining portion of the billet which is in the billet container, and in this way the time required for the operations is not increased by the cooling of the parts of the extrusion press.

With the above objects in view the present invention includes, in an extrusion press of the above type, conventional extruding structure such as the billet container and a piercing ram. According to the present invention there is provided a unitary means which cooperates simultaneously with the billet container and with the piercing ram for cooling the piercing ram and for simultaneously removing from the billet container the portion of a billet which remains therein after the metal tube is extruded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary, partly schematic, sectional elevational view of an extrusion press showing the position which the parts take when the extrusion of a metal tube has just been completed;

FIG. 2 shows the position which the parts of FIG. 1 take just after the extruding of the metal tube has been completed;

FIG. 3 shows a position which the parts take immediately after the position of the parts shown in FIG. 2, FIG. 3 illustrating the device of the present invention in its operative position preparatory to cooling a piercing ram and removing from the billet container the portion of a billet which remains therein after the tube is extruded;

FIG. 6 shows a slightly modified construction which extrudes a billet into a metal tube in a manner different from FIGS. 1–5, and the structure of FIG. 6 also shows a different embodiment of a combined cooling and ejecting device of the present invention, the parts being shown in FIG. 6 just at the end of the extrusion of a metal tube;

FIG. 7 shows the position which the parts take immediately after the position of FIG. 6, FIG. 7 showing how the finished tube is removed from the part of the billet which remains in the billet container to be removed therefrom by the structure of the invention which also cools the piercing ram and the extrusion ram with the structure of FIG. 6;

FIG. 8 shows the position which the parts of FIGS. 6 and 7 take when the end portion of the billet which remains in the billet container has just been removed therefrom;

Figure 11:
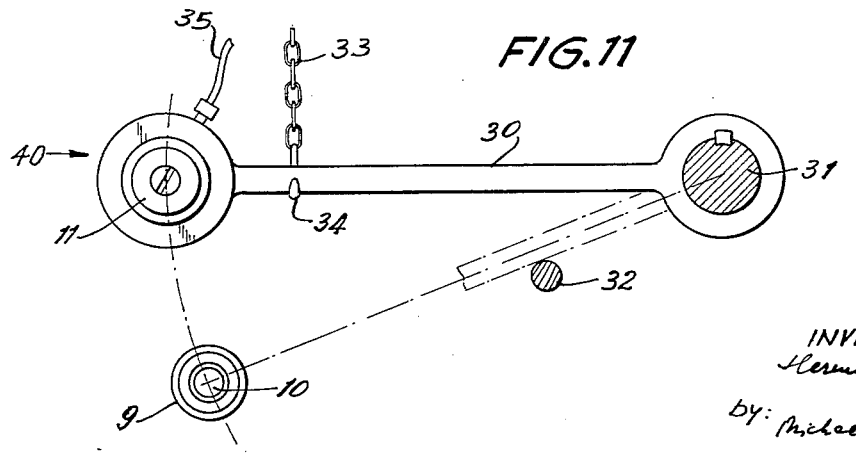

FIG. 10 shows a variation of the structure of FIGS. 1–5, this variation being capable of cooling the interior of the billet container as well as the piercing ram and also being capable of removing from the interior of the billet container a shell of the billet which remains therein after the tube is extruded; and FIG. 11 is a partly sectional transverse view illustrating the mounting of the device of the invention for movement between its operative and rest positions.

The unitary means which forms the combined cooling and ejecting device of the present invention includes, in the embodiment of FIGS. 1–5, an elongated tubular housing 1 which is open at its left end, as viewed in FIGS. 1–5. The wall portion of the housing 1 adjacent its left open end is formed with an annular passage 2, and the housing is formed with a plurality of bores 3 leading from the passage 2 to the interior of the housing 1 and distributed about the axis thereof, so that a cooling fluid in the interior of the passage 2 will be delivered through the bores 3 to the interior of the housing in the form of a cooling spray where a liquid such as water or oil serves as the cooling fluid.

FIG. 1 shows parts of the extrusion press in the position which they take when a metal tube has just been extruded, and the unitary cooling and ejecting means 40 is shown in FIG. 1 in an inoperative rest position. The extrusion press includes a support 7 which remains stationary and which is formed with cylinders which receive a plurality of parallel pistons 8 which extend horizontally, as viewed in FIG. 1, so that when fluid under pressure is introduced into the cylinders the pistons 8 move to the left, as viewed in FIG. 1, so as to advance the billet container 4 to the left, this billet container 4 being connected to and carried by the pistons 8 and being formed with an axial horizontal bore passing therethrough. The support 7 fixedly carries a die holder 6 which is ring-shaped and which is coaxial with the bore of the container 4, and this die holder 6 carries the extruding die 5. In the position of the parts shown in FIG. 1 a billet has been extruded from the interior of the billet container 4 through the die 5 into the form of an elongated metal tube 13. In a manner well known in the art this billet was first pierced by a piercing ram 10 which advances axially to the right, as viewed in FIG. 1, to the position shown in FIG. 1, and while remaining in this position the extrusion ram 9 advances to the right, as viewed in FIG. 1, to advance a dummy ring 12 which surrounds the piercing ram 10 along the latter to the right, as viewed in FIG. 1, so as to extrude the billet through the die 5 and around the ram 10 which forms a mandrel to determine the interior size of the tube 13. This dummy 12 has an outer diameter slightly less than the inner diameter of the cylindrical bore of the billet container 4, so that when the tube 13 has been extruded, as shown in FIG. 1, there remains in the container 4 an elongated tubular shell and a billet portion connected to the right end of the shell, this entire portion of the billet which remains in the interior of the billet container 4 at the end of the extrusion process being indicated at 14 in FIG. 1.

When the extrusion of the tube 13 has ended so that the parts have the position shown in FIG. 1, the pistons 8 are advanced to the left to the position shown in FIG. 2, and in this way the billet container 4 is also advanced to the left and this causes the shell 14a which adheres to the inner surface of the billet container to be torn from the stub 14b which remains between the dummy 12 and the die 5. Thereafter, the hydraulic fluid is moved so as to advance the pistons 8 to the right to the position shown in FIG. 3, so that the billet container 4 again has the position of FIG. 1, and simultaneously the rams 9 and 10 are advanced to the left to the position shown in FIG. 3.

The cooling and ejecting device of the present invention is carried by a rigid arm which is supported for turning movement, for example, so as to swing the device 40 from the position of FIGS. 1 and 2 to that of FIG. 3, or the arm which carries the device of the present invention may be guided for vertical movement from the rest position of FIGS. 1 and 2 to the operating position shown in FIG. 3. In the operating position of FIG. 3 the elongated tubular housing 1 is coaxially arranged between the rams 9 and 10 and the bore of the billet container 4, and with the parts in this position cooling fluid is delivered from any suitable source to the opening 15 which leads into the passage 2 formed in the wall of the housing 1. At this time the extrusion ram 9 engages and closes the left open end of the housing 1, and it will be noted that the housing 1 is formed with a cutout 16 adjacent its left open end so that the cooling fluid can fall from the interior of the housing 1 through the passage 16. The piercing ram 10 is continuously reciprocated back and forth within the housing 1 between the solid and dot-dash line position shown in FIG. 3, so that this percing ram is very effectively cooled by the cooling fluid which sprays from the bores 3 onto the piercing ram.

Figure 4:
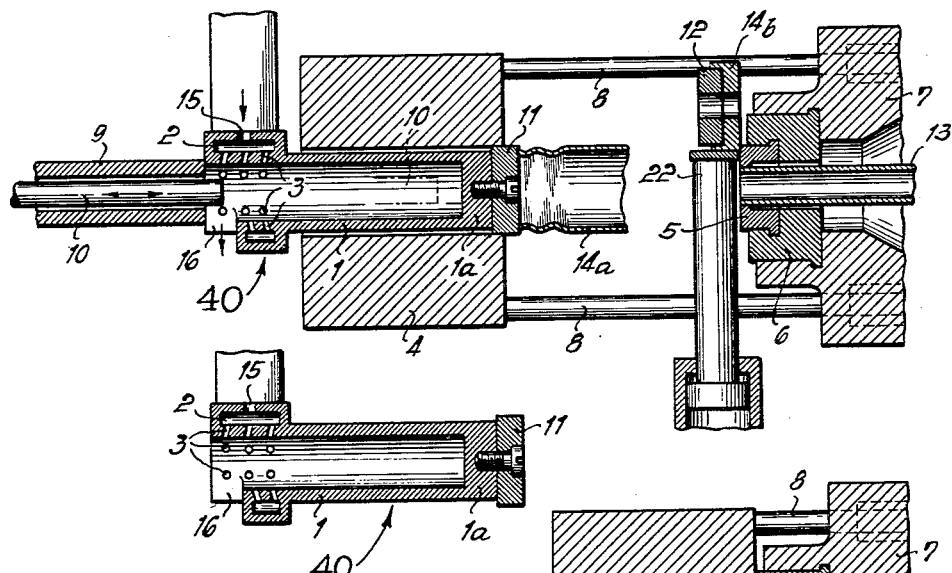
FIG. 4 illustrates the position which the parts take after the structure of the invention has removed a shell from the interior of the billet container and after the piercing ram has been cooled.

Simultaneously with this cooling of the piercing ram while the unitary cooling and ejecting means 40 remains in the position of FIG. 3, the billet container 4 is advanced to the left from the position of FIG. 3 to that of FIG. 4, and during this time the left end of the shell 14a is engaged by the ejector member 11 which is removably connected with the closed end 1a of the tubular housing 1. Thus, simultaneously with the cooling of the piercing ram 10 the device of the invention cooperates with the moving billet container to remove therefrom the shell 14a which remains after the tube 13 is extruded.

Furthermore, simultaneously with these operations hydraulic liquid under pressure is supplied to a hydraulic shearing device 22 which moves upwardly from the position of FIG. 3 to that of FIG. 4 to shear from the left face of the die 5 the stub 14b, and the dummy ring 12 remains in engagement with this stub. In this way the extruded tube 13 is finished and can be removed from the extrusion press and at the same time the piercing ram 10 is cooled and the shell 14a is simultaneously removed from the billet container 4.

Figure 5:
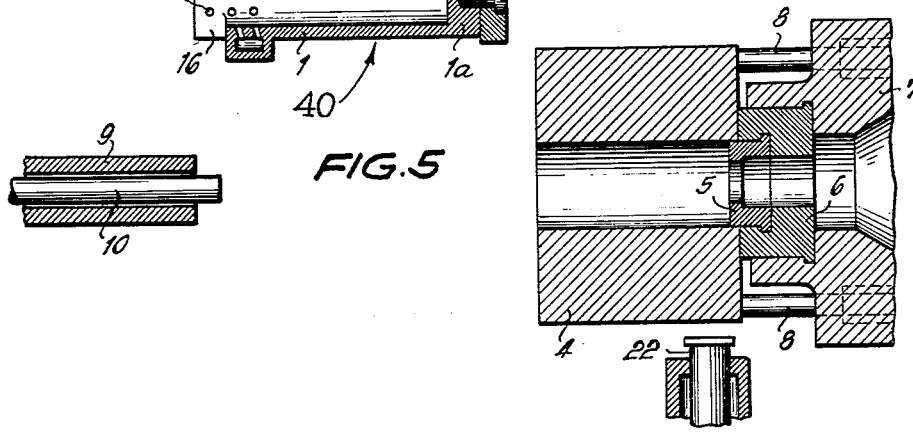
FIG. 5 illustrates the position which the parts of FIGS. 1–4 take at the start of the cycles of operations when the press is ready to be loaded with another billet.
Figure 9:
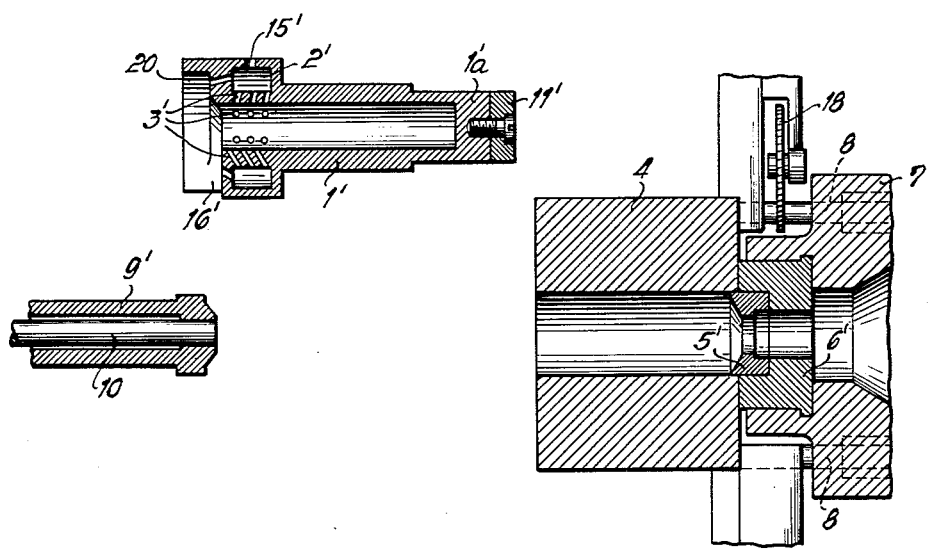
FIG. 9 shows the position which the parts of FIGS. 6–8 take at the start of a cycle of operations where a new billet is to be placed in the billet container.

Thereafter, the billet container 4 is returned to its starting position shown in FIG. 5 and the combined cooling and ejecting device of the present invention is moved back to its inoperative position shown in FIG. 5. The press is shown in FIG. 5 in the starting position ready to receive another billet for extruding another tube.

It will be noted that the tubular housing 1 is substantially longer than the bore of the billet container 4, so that the ejector member 11 will be located beyond the right end of the billet container 4, as is apparent from FIG. 4, to guarantee that the entire shell 14a is removed. Furthermore, it will be noted that with the parts in the position of FIG. 3 the structure of the invention forms an extension of the extruding ram 9, so that the distance through which the billet container 4 is required to be moved is substantially less than would be the case if the structure did not form an extension of the ram 9, and thus with this arrangement the structure operates in less time and less hydraulic fluid is required to be delivered to the cylinders which receive the pistons 8 for moving the billet container 4 from the position of FIG. 3 to that of FIG. 4. Moreover, it will be seen that with a horizontal press which is shown in FIGS. 1–5, the location of the discharge opening 16 for the cooling fluid is such that none of the cooling fluid can have access to the interior of the billet container 4. The invention is also applicable to vertical presses, but with such presses it is necessary to provide a separate means for guaranteeing that the cooling fluid is removed from the interior of the billet container 4.

In those cases where the billet is extruded in such a way that it does not form a shell 14a, it is unnecessary to provide the device 40 with a removable ejector member 11 which has a close sliding fit within the billet container 4, and in fact the cooling device need not even enter into the billet container, since in this case the shearing device 22 will remove the entire part of the billet which remains after the tube is extruded.

It will be noted that with the structure of the invention all of the cooling fluid is reliably maintained away from those parts of the press which are not to be engaged thereby, and thus, there is no restriction as to the amount of cooling fluid or the intensity of the spray which is applied to the reciprocating piercing ram which also need not be influenced in its own construction in any way so as to be cooled by the structure of the invention.

With the embodiment of the invention which is illustrated in FIGS. 6–9, the device of the invention is slightly different from that of FIGS. 1–5 in that it includes at its left end a flange 20 which extends beyond the open end of the housing 1' and which forms the discharge passage 16'. The passage 2' is provided with additional bores 3' located at the left end of the passage 2' for directing the cooling fluid to the space which is surrounded by the flange 20. The parts are shown in FIG. 6 in the position which they take when a tube 17 has just been extruded, and it will be noted that with this construction the ram 9' is slightly modified so that it slidably engages the interior surface of the billet container 4 so that no shell remains therein.

After the tube 17 has just been extruded so that the parts have the position shown in FIG. 6, the rams 9 and 10 are moved away to the left, and the pistons 8 are also moved to the left so as to locate these parts in the position shown in FIG. 7. Before the rams 9' and 10 and the billet container 4 reach the position of FIG. 7, the combined cooling and ejecting device of the present invention has been moved from the inoperative position of FIG. 6 to the operating position of FIG. 7, in the manner described above, and now the rams 9' and 10 as well as the billet container 4 continue to move until they have the position shown in FIG. 7. During this movement the die 5' adheres to the extruded billet which in itself adheres to the interior of the billet container 4, so that the tube 17 is advanced toward the left through the die carrier 6', and a sawing device 18 is carried by a carriage mounted on the billet container 4, and at this time the carriage is actuated so as to move the sawing device from the position of FIG. 6 to that of FIG. 7 so that the sawing device cuts the tube 17 so that the portion of the latter on the right of the saw represents the finished extruded tube, while the portion 19 represents the portion of the billet which is to be discarded. The parts are shown in FIG. 7 just after the saw device 18 has cut through the extruded tube and moved to the left away from the latter.

The sawing device 18 is now moved on its carriage back to its rest position which is shown in FIG. 8, and while cooling fluid is directed from the passage 2' through the bores 3' the pistons 8 continue to advance to the left to the position of FIG. 8 and the billet container 4 also continues to advance to the left, so that the ejector member 11' finally engages the portion 19 of the billet and removes the latter together with the die 5' from the interior of the billet container 4, the parts being shown in this position in FIG. 8. Simultaneously, the piercing ram 10 is reciprocated back and forth between the solid and the dot-dash line position shown in FIG. 8 so that it is effectively cooled, and it will be noted that the left end of the housing 1' is so shaped that it engages the right end of the extrusion ram 9 which is located within the space surrounded almost entirely by the flange 20. The fluid issuing from the left bores 3 of FIG. 8 cools the right end of the extrusion ram 9', and the bottommost part of the extrusion ram 9', as viewed in FIG. 8, is spaced upwardly from the bottommost part of the left opening of the housing 1', which is to say the lowermost part of the right end of the ram 9' is spaced from the lowermost part of the left opening of the housing 1', so that the cooling fluid within the housing 1' can escape through the passage 16' together with the cooling fluid which cools the right end of the ram 9'.

The parts are then moved from the position of FIG. 8 to that of FIG. 9 where they are again ready to receive another billet, and the above operations are again repeated after the billet has been extruded. It will be noted that with this embodiment, all of the operations performed by the embodiment of FIGS. 1–5 are also performed, and in addition the piercing ram 10 itself is also cooled.

The rams 9' and 10 are moved from the position of FIG. 6 to that of FIG. 7 as soon as the extruding is completed, so as to reduce as much as possible the tendency of these rams to become heated. The unused portion 19 of the billet is removed from the die 5' at a point away from the extrusion press, and the die holder 6' is preferably carried by a suitable carriage which enables it to be shifted to a position where it can receive another die 5' and then returned to its operating position so that another extrusion cycle may be started.

In those cases where the billet container 4 does not shift along the axis of its bore, the unitary cooling and ejecting means may itself be mounted for shifting movement, and this may be done simply by connecting its carrier arm on a turnable shaft with which this arm is constrained to turn but along which it is axially movable by any suitable device, so that the device can be axially shifted in the event that the billet container 4 is not axially shifted. With such a construction the die and its carrier are laterally shiftable in a direction transverse to their common axis to a position which provides a free opening in the support 7 to receive the portion of the billet which is ejected by the device of the invention.

With the structure of the invention the turnable shaft which is connected to the arm which carries the cooling device may be guided for movement along a pair of columns and when the rams have moved to the left from their operation position just beyond the cooling device the latter turns into axial alignment with the rams and a suitable spring device maintains the cooling device in engagement with the right end of the extrusion ram.

Referring now to FIG. 10, the embodiment of the invention which is illustrated therein is capable of cooling the interior of the billet container 4 as well as performing in the same way as the other embodiments of the invention. As may be seen from FIG. 10, the device of the invention is shown in position within the billet housing 4 and the shell 14a has just been ejected from the container 4 which is moving to the left at this time, while the piercing ram 10 continues to advance to the left and right within the interior of the housing 1" to be cooled by the cooling liquid which reaches the piercing ram 10 from the bores 3".

With the embodiment of FIG. 10 the housing 1" forms an inner housing and is surrounded by an outer housing 21 which is fixed to the wall of the device which is formed with the passage 2 and which is spaced from the inner housing 1" so as to define therewith an elongated annular passage 22', and the wall of the housing 21 is formed with a plurality of bores 24 passing therethrough so that the cooling medium which reaches the space 22' through the inlet 23 flows to the right along the space 22' and then discharges through the bores 24 to cool the inner surface of the billet container 4. The bores 24 are inclined so that the cooling fluid issuing therefrom is directed to the left, as viewed in FIG. 10, along the surface of the billet container 4, and in this way if any portions of the shell 14a remain against the inner surface of the billet container 4, the cooling fluid will remove such portions and they will fall out at the left end of the billet container 4, as viewed in FIG. 10.

The device of the invention is provided with an ejector member 11, as was pointed out above, and this member 11" of FIG. 10 is fixed to the housing 1" in the manner shown in FIG. 10. In the embodiment of FIG. 10 the member 11" is formed with an annular cutout 25 which extends axially along the member 11" through a substantial distance and which communicates with and forms an extension of the space 22', so that the cooling fluid supplied to this space 22' through the inlet 23 will also flow into the annular space 25 formed in the ejector member 11". This member 11" is furthermore formed with a plurality of radial bores 26 so that the cooling fluid which reaches the space 25 will flow outwardly through the bores 26 to the inner surface of the billet container 4. It will be noted that the member 11" is formed with an annular groove which surrounds the bores 26 and communicates therewith so that the cooling fluid has access to the inner surface of the billet container 4 through this groove, and also it will be noted that just to the left of this annular groove the member 11" is formed with substantially axial bores which direct the cooling fluid back toward the left open end of the billet container 4, so that the fluid which discharges from the bores 26 joins the fluid discharging through the bores 24 and flows with the latter out through the left end of the billet container 4, as viewed in FIG. 10. Thus, with the embodiment of FIG. 10 the device of the invention cools the piercing ram, simultaneously ejects the shell 14a, and simultaneously cools the billet container 4, and furthermore the construction of the ejector element 11" is such that the billet container 4 is cooled even at the portion thereof which is engaged by the ejector member 11".

The billet container 4 is made of a high quality steel and the cooling medium which is supplied to the inner surface of the billet container 4 with the structure of FIG. 10 is preferably compressed air or saturated steam.

FIG. 11 shows one possible embodiment of a structure which mounts the combined cooling and ejecting device of the present invention for movement between its rest and operative positions. Referring to FIG. 11, the unitary means 40 for cooling the structure of the extrusion press as well as for ejecting a portion of a billet which remains in the billet container after a tube is extruded is fixedly connected with an arm 30 carried by a shaft 31 which has an axis parallel to the axis of the rams 9 and 10, and this shaft 31 is supported by any suitable bearings for turning movement about its axis. A chain 33 is supported on any stationary support and carries at its bottom end a hook 34 which engages the arm 30 to maintain the device in its solid line rest position shown in FIG. 11. When the device is to be moved to its operative position the arm 30 is unhooked from the hook 34 and is allowed to move downwardly by its own weight until the arm 30 engages a stationary stop 32, and at this time the axis of the device 1 coincides with the axis of the rams 9 and 10 which in the meantime have been returned to a position distant from the billet container 4 to an extent sufficient to provide between the billet container 4 and the piercing rams 9 and 10 a space sufficient to receive the device of the invention therebetween, and then the rams 9 and 10 are advanced to the position indicated in FIG. 3. FIG. 11 also shows a conduit 35 which communicates with the opening 15 and which communicates with any suitable source of cooling fluid to supply this cooling fluid to the device of the invention. The conduit 35 is in the form of a flexible hose so that the parts are movable while maintaining the communication between the cooling device and the source of cooling fluid. A similar hose is connected with the inlet 23 of the embodiment of FIG. 10.

It will be understood that each of the elements described above, or two or more together, may also find a useful application in other types of extrusion presses differing from the types described above.

While the invention has been illustrated and described as embodied in cooling arrangements for extrusion presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an extrusion press for extruding a metal tube from a billet, in combination, a piercing ram, a coaxial die and a billet container member having a bore axial with the piercing ram, said piercing ram, die and billet container member forming part of the extrusion press; a unitary cooling and ejecting means cooperating with said billet container member and piercing ram for cooling said piercing ram after a metal tube is extruded and for simultaneously ejecting from said billet container member the portion of a billet which remains therein after the metal tube is extruded, said unitary means including an elongated tubular housing member movable to and from an operating position located between said piercing ram and billet container member and being coaxial with said piercing ram in said operating position, means communicating with said housing member for conveying a cooling fluid thereto, said housing member having an open end distant from said billet container member in the operating position of said unitary means and said piercing ram being movable into said housing member through said open end thereof to be cooled in said housing member, said housing member having a cutout adjacent to said open end thereof through which a cooling fluid escapes from the interior of said housing member, said housing member having an ejector end portion directed toward said billet container member when said unitary means is in said operating position thereof; and moving means cooperating with one of said members for moving the same axially along the other of said member so that said bore becomes occupied by said housing member to have a billet portion remaining in said bore ejected therefrom by said ejector end of said housing member simultaneously with the cooling of said piercing ram.

2. In an extrusion press for extruding a metal tube from a billet, in combination, a piercing ram, a coaxial die and a billet container having a bore coaxial with the piercing ram, said piercing ram, die and billet container forming part of the extrusion press; a unitary cooling and ejecting means cooperating with said billet container and piercing ram for cooling said piercing ram after a metal tube is extruded and for simultaneously ejecting from said billet container the portion of a billet which remains therein after the metal tube is extruded, said unitary means including an elongated tubular housing movable to and from an operating position located between said piercing ram and billet container and being coaxial with said piercing ram in said operating position, means communicating with said housing for conveying a cooling fluid thereto, said housing having an ejector end directed toward and an open end distant from said billet container in the operating position of said unitary means and said piercing ram being movable into said housing through said open end thereof to be cooled in said housing, said housing having a cutout adjacent to said open end thereof through which a cooling fluid escapes from the interior of said housing, and said extrusion press including an extrusion ram which engages said housing at said open end thereof when said housing is in said operating position; and moving means moving said billet container axially along said housing while said piercing ram is cooled therein, so that said housing occupies said bore and ejects said billet portion therefrom simultaneously with the cooling of said piercing ram.

3. In an extrusion press for extruding a metal tube from a billet, in combination, a piercing ram, a coaxial die and a billet container having a bore coaxial with the piercing ram, said piercing ram, die and billet container forming part of the extrusion press; an elongated tubular housing movable to and from an operating position located between said piercing ram and billet container and being coaxial with said piercing ram when said housing is in said operating position thereof, said housing having an open end distant from said billet container when said housing is in its operating position and said piercing ram being movable into said housing through said open end thereof, said housing having a cutout adjacent to said open end thereof through which a cooling fluid may escape from the interior of said housing; and means communicating with said housing for supplying thereto a cooling fluid for cooling said piercing ram while the latter is located in said housing.

4. In an extrusion press for extruding a metal tube from a billet, in combination, a piercing ram, a coaxial die and a billet container having a bore coaxial with the piercing ram, said piercing ram, die and billet container forming part of the extrusion press; an elongated tubular housing movable to and from an operating position located between said piercing ram and billet container and being coaxial with said piercing ram when said housing is in said operating position thereof, said housing having an open end distant from said billet container when said housing is in its operating position and said piercing ram being movable into said housing through said open end thereof, said housing having a cutout adjacent to said open end thereof through which a cooling fluid may escape from the interior of said housing; means communicating with said housing for supplying thereto a cooling fluid for cooling said piercing ram while the latter is located in said housing; and ejecting means operatively connected with said housing for movement with the latter to and from said operating position and cooperating with said billet container for ejecting from the latter the portion of a billet which remains therein after the metal tube is extruded.

5. In an extrusion press for extruding a metal tube from a billet, in combination, a piercing ram, a coaxial die and a billet container having a bore coaxial with the piercing ram, said piercing ram, die and billet container forming part of the extrusion press; an elongated tubular housing movable to and from an operating position located between said piercing ram and billet container and being coaxial with said piercing ram when said housing is in said operating position thereof, said housing having an open end distant from said billet container when said housing is in its operating position and said piercing ram being movable into said housing through said open end thereof, said housing having a cutout adjacent to said open end thereof through which a cooling fluid may escape from the interior of said housing; means communicating with said housing for supplying thereto a cooling fluid for cooling said piercing ram while the latter is located in said housing; and ejecting means operatively connected with said housing for movement with the latter to and from said operating position and cooperating with said billet container for ejecting from the latter the portion of a billet which remains therein after the metal tube is extruded, said ejecting means operating simultaneously with the cooling of said piercing ram in said housing.

References Cited in the file of this patent

UNITED STATES PATENTS

| | | |
|---|---|---|
| 1,948,400 | Schlenstedt | Feb. 20, 1934 |
| 2,337,804 | Dempsey | Dec. 28, 1943 |
| 2,728,453 | Thweatt et al. | Dec. 27, 1955 |
| 2,732,066 | Albers | Jan. 24, 1956 |
| 2,778,494 | Kreidler | Jan. 22, 1957 |
| 2,883,049 | Arenz | Apr. 21, 1959 |
| 2,925,908 | Tornblom et al. | Feb. 23, 1960 |

FOREIGN PATENTS

| | | |
|---|---|---|
| 407,858 | Great Britain | Mar. 29, 1934 |
| 636,744 | Germany | Oct. 15, 1936 |
| 71,836 | Netherlands | Mar. 16, 1953 |
| 781,737 | Great Britain | Aug. 21, 1957 |
| 1,029,785 | Germany | May 14, 1958 |